US011238225B2

(12) United States Patent
Liu et al.

(10) Patent No.: US 11,238,225 B2
(45) Date of Patent: Feb. 1, 2022

(54) READING DIFFICULTY LEVEL BASED RESOURCE RECOMMENDATION

(71) Applicant: Hewlett-Packard Development Company, L.P., Houston, TX (US)

(72) Inventors: Lei Liu, Palo Alto, CA (US); Georgia Koutrika, Palo Alto, CA (US); Jerry J Liu, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 610 days.

(21) Appl. No.: 15/542,918

(22) PCT Filed: Jan. 16, 2015

(86) PCT No.: PCT/US2015/011694
§ 371 (c)(1),
(2) Date: Jul. 11, 2017

(87) PCT Pub. No.: WO2016/114790
PCT Pub. Date: Jul. 21, 2016

(65) Prior Publication Data
US 2018/0004726 A1 Jan. 4, 2018

(51) Int. Cl.
*G06F 17/00* (2019.01)
*G06F 40/284* (2020.01)
(Continued)

(52) U.S. Cl.
CPC ............ *G06F 40/284* (2020.01); *G06F 16/30* (2019.01); *G06F 16/3323* (2019.01);
(Continued)

(58) Field of Classification Search
CPC .......... G09B 5/00; G09B 19/06; G09B 17/00; G09B 19/00; G06F 17/2705;
(Continued)

(56) References Cited

U.S. PATENT DOCUMENTS 8,725,059 B2 5/2014 Lofthus et al.
8,838,518 B1 9/2014 Pocha et al.
(Continued)

FOREIGN PATENT DOCUMENTS

JP 2011-170700 A 9/2011

OTHER PUBLICATIONS

"Computational Assessment of Text Readability: A Survey of Current and Future Research", Sep. 8, 2014.
(Continued)

*Primary Examiner* — Michael Ortiz-Sanchez
(74) *Attorney, Agent, or Firm* — HP Inc. Patent Department (57) ABSTRACT

Examples associated with reading difficulty level based resource recommendation are disclosed. One example may involve instructions stored on a computer readable medium. The instructions, when executed on a computer, may cause the computer to obtain a set of candidate resources related to a source document. The candidate resources may be obtained based on content extracted from the source document. The instructions may also cause the computer to identify reading difficulty levels of members of the set of candidate resources. The instructions may also cause the computer to recommend a selected candidate resource to a user. The selected candidate resource may be recommended based on subject matter similarity between the selected candidate resource and the source document. The selected candidate resource may also be recommended based on reading difficulty level similarity between the selected candidate resource and the source document.

19 Claims, 7 Drawing Sheets

(51) Int. Cl.
*G06F 16/332* (2019.01)
*G06F 16/30* (2019.01)
*G06F 16/36* (2019.01)
*G06F 16/35* (2019.01)
*G06F 16/31* (2019.01)
*G06F 40/106* (2020.01)

(52) U.S. Cl.
CPC .............. *G06F 16/35* (2019.01); *G06F 16/36* (2019.01); *G06F 16/313* (2019.01); *G06F 40/106* (2020.01)

(58) Field of Classification Search
CPC .. G06F 17/274; G06F 17/30699; G06F 17/27; G06F 17/3053; G06F 17/30867; G06F 17/277; G06F 17/30997; G06F 19/00; G06F 17/21; G06F 17/2785; G06F 17/30011; G06F 17/30705; G06F 17/30864; G06F 17/2795; G06F 17/30554; G06F 17/3061; G06F 17/30616; G06F 17/30643; G06F 17/30731; G06F 17/3097; G10L 25/48; H04H 60/33; H04H 60/46; H04H 60/65; G06Q 10/063112; G06Q 50/20; G06N 99/005; Y10S 707/99933
See application file for complete search history.

(56) References Cited

U.S. PATENT DOCUMENTS

| | | | |
|---|---|---|---|
| 2002/0198875 A1* | 12/2002 | Masters | G06F 17/3069 |
| 2003/0104344 A1* | 6/2003 | Sable | G09B 17/00 |
| | | | 434/178 |
| 2006/0282413 A1* | 12/2006 | Bondi | G06F 17/30864 |
| 2007/0294289 A1 | 12/2007 | Farrell | |
| 2010/0150012 A1 | 5/2010 | Park | |
| 2010/0273138 A1* | 10/2010 | Edmonds | G09B 3/00 |
| | | | 434/322 |
| 2011/0131216 A1 | 6/2011 | Chakravarthy et al. | |
| 2011/0219304 A1 | 9/2011 | Nakano | |
| 2013/0060763 A1 | 3/2013 | Chica et al. | |
| 2013/0179169 A1* | 7/2013 | Sung | G06F 17/27 |
| | | | 704/254 |
| 2013/0204869 A1* | 8/2013 | Gabrilovich | G06F 17/30705 |
| | | | 707/728 |
| 2013/0224697 A1* | 8/2013 | McCallum | G06Q 30/0251 |
| | | | 434/178 |
| 2014/0024009 A1 | 1/2014 | Nealon et al. | |
| 2014/0074828 A1 | 3/2014 | Mathur | |
| 2014/0295384 A1* | 10/2014 | Nielson | A61B 5/162 |
| | | | 434/157 |
| 2014/0317077 A1 | 10/2014 | Cho | |

OTHER PUBLICATIONS

Miltsakaki,E. "Read-X: Automatic Evaluation of Reading Difficulty of Web Text", Sep. 4, 2007.

\* cited by examiner

READING DIFFICULTY LEVEL BASED RESOURCE RECOMMENDATION

BACKGROUND

When a student encounters difficulties understanding a passage in a document, textbook, or other reading material, the student may seek out additional or supplemental resources to help them understand the passage. Some students may rely on, for example, teachers or a resources physically available to the student (e.g., an encyclopedia, a book in a library). Other students may use internet search engines to access many different resources, organized based on, for example, contents of a query the student generates when seeking more information related to the passage.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Systems, methods, and equivalents associated with reading difficulty level based resource recommendation are described. Reading difficulty level based resource recommendation may be achieved taking into account the reading difficulty of texts when recommending resources requested by a user. By way of illustration, in response to a request by a user associated with a source document, candidate resources related to the source document may be obtained. These candidate resources may be compared to the source document to identify which candidate resources share similar content to the source document, as well as to identify which candidate resources have reading difficulty levels similar to that of the source document. The similarities in reading difficulty levels and the similarities in content may then be used to select which candidate resources to provide to the user in response to the user's request.

Figure 1:
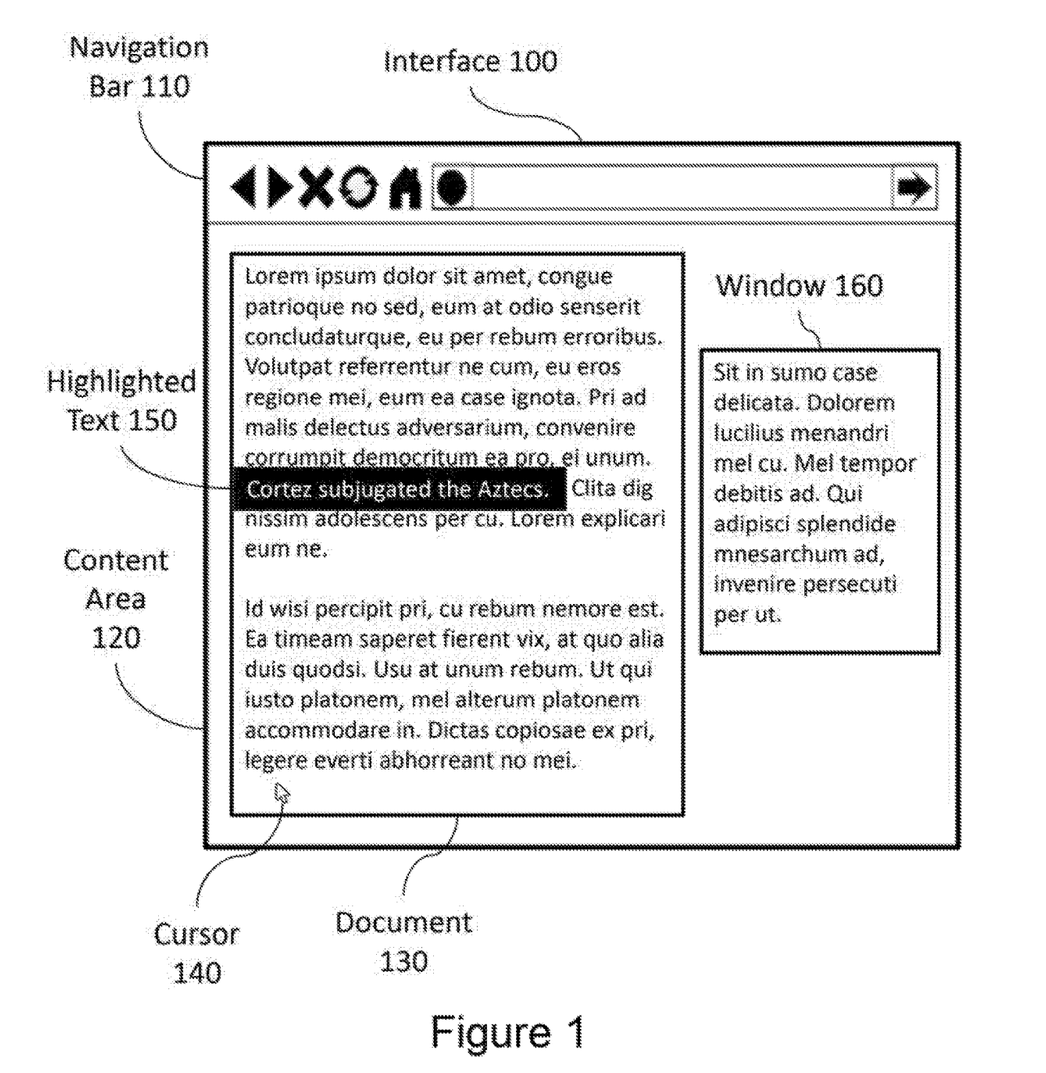
FIG. 1 illustrates an example interface that may allow a user to interact with example systems and methods, and equivalents.

FIG. 1 illustrates an example interface 100 that may allow a user to interact with example systems and methods, and equivalents. It should be appreciated that interface 100 is an illustrative example and many different interfaces may be used. For example, interface 100 may be an appropriate interface for a system modeled based on a web browser on a personal computer. An interface designed to operate on a tablet or other mobile device may be organized according to design and/or user interaction practices associated with that device. Additionally, though some methods of interacting with interface 100 are described, other methods may also be appropriate.

Interface 100 includes a navigation bar 110. In this example, where interface 100 may be designed similar to a web browser, navigation bar 110 may include forward and back buttons, a home button, an address bar, a search bar, and so forth. In the example where an address bar is included, the address bar may indicate a document or a location of a document being viewed by a user (e.g., document 130).

Interface 100 also includes a content area 120. Content area 120 may include many sub areas displaying content such as document 130. Document 130 may be a text accessed by a user interacting with interface 100. Document 130 may also include content besides text including, for example, images, video, audio, and so forth. Though examples herein generally make reference to comparing text documents, "reading difficulty lever" comparisons and content similarity comparisons may also be made between other types of content. For example, words spoken in a video may be converted to text to facilitate comparing the "reading difficulty level" of the video to another video or to a text document.

The user may be able to interact with elements of interface 100. The user may interact with interface 100 via, for example, cursor 140. Cursor 140 may be controlled by the user with a mouse or other similar device. Other peripherals (e.g., a keyboard) and technologies may also allow the user to interact with interface 100.

In this example, the user has interacted with document 130 using cursor 140 by highlighting a portion of document 130 to create the highlighted text 150. In this example, a sentence has been highlighted, though in other scenarios highlighted text 150 could be a word, a portion of a sentence, several sentences, and so forth. In response to highlighting the text, systems and methods, and equivalents, disclosed herein may be able to analyze highlighted text 150 and identify information related to highlighted text 150 that the user is interested in learning more about. These systems, methods, and equivalents may then retrieve candidate resources that are external to document 130, and identify which of the candidate resources are likely to contain this information. Further, these systems, methods, and equivalents, may compare reading difficulty levels of the candidate resources to the reading difficulty level of document 130 prior to recommending one or more of the candidate resources to the user. Ultimately, several candidate resources may be selected for provision to the user based on the relatedness of various candidate resources to document 130, the reading difficulty levels of the candidate resources and/or document 130, and other attributes. The user may be referred to the candidate resources via components of interface 100.

There may be several approaches for referring a user to candidate resources. In this example highlighted text 150 reads "Cortez subjugated the Aztecs." Based on the user interaction with document 130 creating highlighted text 150, example systems and methods, and equivalents may identify candidate resources related to document 130 and/or highlighted text 150, compare the relatedness of the candidate resources to document 130 and/or highlighted text 150, and compare the reading difficulty level of the candidate resources to document 130 and/or highlighted text 150.

In one example, a candidate resource itself may be provided to the user in window 160 upon the user interacting with document 130 to create highlighted text 150. For example, after analyzing candidate resources for their respective content similarities and reading difficulty level similarities to document 130, an encyclopedia article regarding Cortez may be displayed in window 160.

In an alternative example, links (e.g., hyperlinks) to candidate resources may be provided to the user (e.g., via window 160), allowing the users to access the candidate resources by interacting with the links, potentially directing interface 100 to present a candidate resource in content area 120, replacing document 130.

Identifying the candidate resources that will be provided to a user via, for example, window 160 may begin by parsing document 130. Parsing document 130 may begin with several preprocessing steps to remove extraneous information from document 130. Preprocessing may include, for example, removing noisy words, removing stop words, stemming, removing extraneous content (e.g., advertisements) and so forth.

Once preprocessing has been completed, an information retrieval technique may be applied to document 130 to identify topics that document 130 discusses. The information retrieval technique may cause the topics to be defined by respective sets of keywords that are associated with the topics. Keywords for a topic may be selected based on words from document 130 that frequently appear near one another when that topic is being discussed in document 130. Consequently, the sets of keywords may be used to define their respective topics. Information retrieval techniques for generating the topics and their associated keywords may include, for example, probabilistic latent semantic indexing (PLSI), latent Dirichlet allocation (LDA), and so forth.

Once the topics have been extracted from document 130, candidate resources may be obtained using the topics. In one example, several candidate resources associated with each topic may be obtained. For example, if document 130 generally discusses the histories of different ancient American cultures at a high level, different cultures may serve as topics, and important people, places, and events may serve as keywords for the topics. Queries to a database or a search engine may be performed using the topics and/or keywords, and several candidate resources for each culture may be obtained. These candidate resources may then be ranked amongst each other based on their respective content similarities to document 130, as well as their respective reading difficulty level similarities to document 130. The topic(s) with which highlighted text 150 is associated may also be considered when ranking the candidate resources.

Content similarity between a candidate resource and document 130 may be obtained by examining similarities between the topics with which document 130 is related, and topics with which the candidate external resources are related. Consequently the process of extracting topics applied to document 130 described above may also be applied to the candidate resources to extract topics and keywords associated with these topics from the candidate resources. Subsequently, a distance function or a similarity function may be used to compare the relevance of the candidate resources to document 130 and/or highlighted text 150. The function may be related to, for example, cosine similarity, Euclidean distance, RBF kernel, and so forth. Explicit references between document 130 and the candidate resources (e.g., hyperlinks, references in a bibliography, citations) may also be taken to consideration when evaluating content similarities between document 130 and the candidate resources. Other methods of showing that the candidate resources and document 130 and/or highlighted text 150 are related may also be used.

By way of illustration, measuring relatedness of document 130 and candidate resources may begin by putting document 130 and the candidate resources into a content bucket. Topics discussed by texts in the content bucket may be calculated using a topic generation technique (e.g., latent Dirichlet allocation). Vectors D, associated with document 130, and $C_i$, associated with respective candidate resources may then be created such that values in the vectors describe a text's relatedness to topics discussed in texts in the content bucket. Vector D may then be compared to the vectors $C_i$ for the candidate resources (e.g., using a distance function, a similarity function). Based on these comparisons, the candidate resources may be ranked according to their relatedness to document 130 and/or highlighted text 150. Alternatively, the ranking of the candidate resources may occur after reading difficulty levels for the candidate resources and/or document 130 have been calculated. This may allow the candidate resources to be ranked in the first instance using a combined metric incorporating both the relatedness data and the reading difficulty level data.

To compare the reading difficulty levels of document 130 and the candidate resources, many techniques may be applied. These techniques may include, for example, Gunnig Fog Index, Flesch Reading Ease, Flesch-Kincaid Test, Automated Readability Index, Coleman Liau Index, Popularity-Based Familiarity, Topic-Based Familiarity, Genere-Based Familiarity, and so forth. Differing reading difficulty level techniques may provide differing outputs. In some examples, it may be appropriate to apply specialized reading difficulty level techniques and/or generic reading difficulty level techniques. Further, attributes of texts may also be considered when scoring the reading difficulty level of a text. These attributes may include, for example, word lengths, average number of syllables per word, sentence length, and so forth.

As used herein, a specialized reading difficulty level technique is a technique that was designed to be applied to specific types of texts for the purpose of analyzing the reading difficulty level of those types of texts. By way of illustration, Linsear Write is a technique developed for the United States Air Force to calculate readability of technical manuals for determining if a manual is appropriate for Air Force pilots. Consequently, Linsear Write techniques may be useful for identifying reading difficulty levels of technical content. In another example, New Dale-Chall Scoring was designed to analyze texts to be provided to American students. Consequently, New Dale-Chall Scoring based techniques may be appropriate for analyzing non-technical texts. Other specialized reading difficulty level analysis techniques may also be useful for identifying reading difficulty levels of texts.

Consequently, to apply an appropriate specialized reading difficulty level technique, it is useful to obtain high level descriptions of the subject matter of document 130 and/or the candidate resources so the appropriate specialized reading difficulty level technique may be applied. Identifying subject matter may be different from identifying topics within texts as described above, because identifying topics may be related to groupings of words within the text, whereas identifying the subject matter involves identifying a general area or field discussed by the text being analyzed. The high level description of the subject matter may include, whether the subject matter is technical or non-technical, what field the subject matter relates to, and so forth.

In one example, the high level description of the subject matter may be obtained by generating resource-word feature matrixes that respectively represent document 130 and individual candidate resources. The weights of words within the feature matrixes may be evaluated using, for example, tf-idf, which compares the term frequency of a word in a text to the inverse document frequency of a word within a text to identify how important the word is to the text. Then, using a supervised statistical model (e.g., support vector machine, boosting, random forest), the high level description of the subject matter of document 130 and the candidate resources may be identified.

Once the subject matter of a text has been identified, an appropriate specialized reading difficulty level technique may be applied to the text to determine the reading difficulty level of the text. In some examples, it may be preferable to apply different specialized reading difficulty level techniques to texts based on their subject matter. This may be appropriate when, for example, a user interacting with document 130 is not a person having specialized understanding in a field (e.g., a high school student), and therefore would like recommended candidate resources to have an overall reading difficulty level similar to document 130 regardless of the subject matter.

In other examples, a specialized reading difficulty level technique associated with document 130 may be applied to the candidate resources. This may be appropriate, for example, if a user has specialized knowledge in a field and is seeking related texts potentially outside their area of expertise that will be understandable to them based on their personal specialized knowledge.

By way of illustration, consider an expert chemist who is examining a PhD level chemistry text that is complicated regarding chemistry content, but simple regarding computer programming content. If the chemist has a PhD in chemistry and a beginner's level of programming understanding, the chemist may prefer that candidate resources are scored based on their personal understanding of these two fields and not scored using differing metrics based on individual subject matter. If a reading difficulty level scoring technique designed for chemistry related texts is applied to the PhD level chemistry text, and a difficulty level scoring technique designed for programming related texts is applied to candidate resources having programming subject matter, the chemist may be recommended candidate resources having PhD level programming content because the reading difficulty levels may be considered similar by the different metrics. Instead, if the reading difficulty level scoring technique designed for chemistry related texts is, applied to the programming related resources, these resources may be identified as being of similar difficulty level to the PhD level chemistry texts, and more appropriate candidate resources may be provided to the chemist.

The distinction between the two types of scenarios described above may be important because some terms that could be considered difficult generally or in certain fields, may be fundamental terms in other fields. For example, a programmer may not find the term "object oriented" difficult, but the chemist might require further explanation of this term. Thus, one specialized reading difficulty level technique may include evaluating word difficulties within various subjects by calculating a probability distribution of words across many different subject matters. Entropy for a given word over the distribution may indicate whether the word is well known across many subjects, or is a specialized term of art used only in a select few of the subjects. The difficulty of the words may then be mapped to a posterior probability problem defined as equation 1 below.

$$P(S_k|w_i) \propto P(S_k|c_j,w_i)P(c_j|w_i) \qquad 1.$$

In equation 1, $P(S_k|w_i)$ is the probability of score $S_k$ given a word $w_i$. $P(S_k|c_j,w_i)$ is the probability of score $S_k$ given that word $w_i$ belongs to subject $c_j$, and $P(c_j|w_i)$ is the probability that word $w_i$ belongs to subject $c_j$.

As used herein, a generic reading difficulty level technique is a technique that may be useful for analyzing the reading difficulty level of a text irrespective of attributes of the type of text being analyzed. One example generic reading difficulty level technique may include comparing words in texts (e.g., document 130, candidate resources) to words organized in a database by grade level. The database may be generated by analyzing texts (e.g., books, articles) commonly taught at various grade levels. By way of illustration, if document 130 contains mostly words taught at or below an $8^{th}$ grade reading difficulty level, the above generic reading difficulty level technique may score it accordingly.

In some instances, it may be appropriate to apply more than one specialized reading difficulty level techniques and/or generic reading difficulty level techniques. In this case each technique may output different scores for a text or words within the text. In this case, the scores may be combined to comparison of the reading difficulty level of document 130 to the reading difficulty levels of candidate resources. In an example where individual words in a text are scored both according to a specialized reading difficulty level technique and a generic reading difficulty level technique, the scores $S_k$ for a word $w_i$ may be combined according to equation 2:

$$S(w_i) = \alpha S_k^{Specialized}(w_i) + (1-\alpha)S_k^{Generic}(w_i) \qquad 2.$$

In equation 2, $\alpha$ is an adjustable parameter between 0 and 1 that facilitates weighting between the specialized technique and the generic technique. Once combined scores for the words in a text have been generated, aggregate score for a text T can be generated according to equation 3:

$$S(T) = \frac{\sum_j Num(w_j) \times S(w_j)}{Num(w)}. \qquad 3$$

In equation 3, $Num(w_j)$ is the number of times word j has shown in text T, and $Num(W)$ is the number of words in text T. As mentioned above, other attributes of text T (e.g., average sentence length, average word length) may also be incorporated into $S(T)$.

Once the reading difficulty level similarities between document 130 and the candidate resources has been identified, as well as the content similarities between document 130 and the candidate resources, a candidate resource may be selected for provision to a user via, for example, interface 100.

In one example, based on the content similarities between document 130 and the candidate resources, the N candidate resources most related to document 130 may be selected. These N candidate resources may then be re-ranked using a ranking function R. In one example, ranking function R may measure readability differences D between each candidate resource c, and the query text t (e.g., document 130), as described by, for example, equation 4:

$$R(c,t) = e^{-\|S(c)-S(t)\|^2} \qquad 4.$$

In equation 4, S(c) is the readability of candidate resource c, and S(t) is the readability of query text t. In an alternative example, the N candidate resources may be ranked using a ranking function R using a combined readability and relatedness metric to attempt to provide an optimal candidate resource to a user of interface 100. One example combined ranking function R is shown below as equation 5:

$$R(c,t) = \alpha e^{Rel(c,t)} + (1-\alpha)e^{-\|Read_c - Read_t\|^2} \qquad 5.$$

In equation 5, Rel(c,t) represents the relatedness score between candidate resource c and query text t, and α is an adjustable parameter between 0 and 1 that facilitates weighting the final ranking between content relatedness and readability relatedness.

As mentioned above, there may be many methods of presenting the candidate resources that are most related to the segment selected by the user (e.g., window 160). Further, depending on attributes of the user (e.g., their level of education), it may be appropriate to limit or increase the number of resources presented to the user to increase the likelihood the user finds an appropriate related resource.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, firmware, software stored on a computer-readable medium or in execution on a machine, and/or combinations of each to perform a function(s) or an action(s), and/or to cause a function or action from another module, method, and/or system. Module may include a software controlled microprocessor, a discrete module (e.g., ASIC), an analog circuit, a digital circuit, a programmed module device, a memory device containing instructions, and so on. Modules may include one or more gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 2:
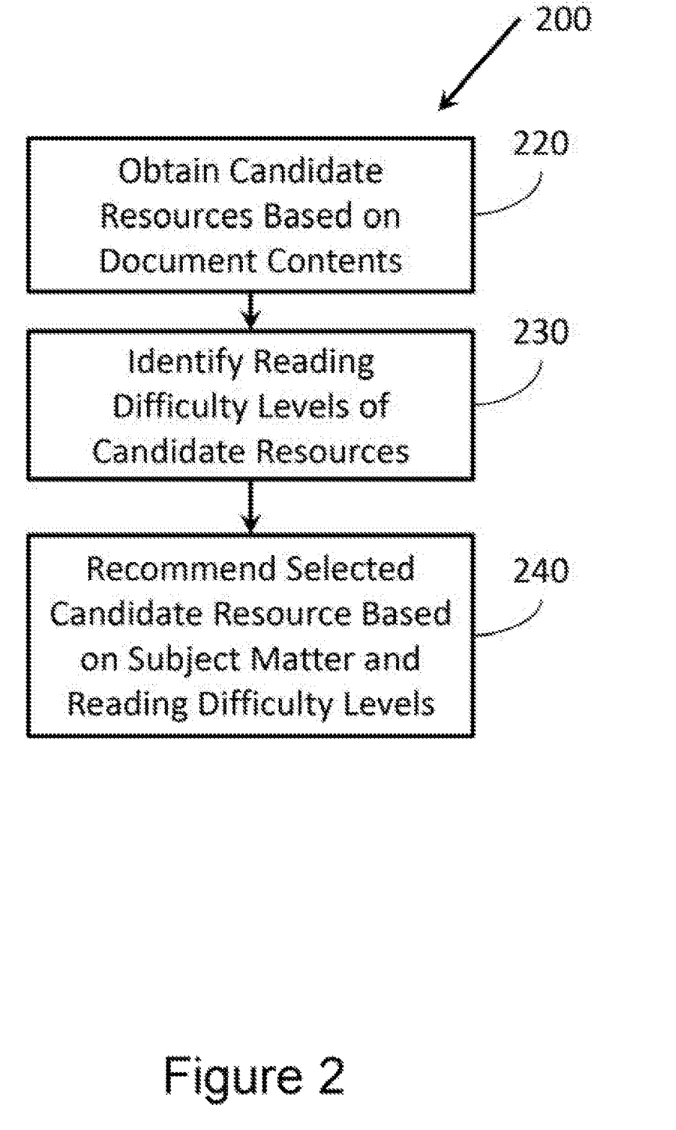
FIG. 2 illustrates a flowchart of example operations associated with reading difficulty level based resource recommendation.

FIG. 2 illustrates an example method 200 associated with reading difficulty level based resource recommendation. Method 200 may be embodied on a non-transitory computer-readable medium storing computer-executable instructions. The instructions, when executed by a computer may cause the computer to perform method 200. In other examples, method 200 may exist within logic gates and/or RAM of an application specific integrated circuit.

Method 200 includes obtaining a set of candidate resources at 220. The candidate resources may be obtained based on content extracted from a source document. The content extracted from the source document may include a set of topics discussed in the source document, as well as sets of keywords that define those topics. Subsequently, using the topics and keywords, the candidate resources may be obtained. In one example, a larger set of candidate resources may be obtained and then pruned down to the set of candidate resources. The larger set of candidate resources may be pruned down by extracting topics and keywords from members of the larger set of candidate resources, and then comparing respective topics and keywords to the topics and keywords extracted from the source document. Candidate resources having similar topics and keywords to the source document may be selected for including in the set of candidate resources. Consequently the candidate resources may cover content related to the content of the source document. The candidate resources may be obtained from, for example, a search engine, a database, and so forth.

Method 200 also includes identifying reading difficulty levels of members of the set of candidate resources at 230. A variety of techniques may be used to evaluate the reading difficulty levels of the candidate resources at 230. These techniques may include, for example, Gunnig Fog Index, Flesch Reading Ease, Flesch-Kincaid Test, Automated Readability Index, Coleman Liau Index, Popularity-Based Familiarity, Topic-Based Familiarity, Genere-Based Familiarity, and so forth. Combinations of techniques may be used, and other attributes of members of the set of candidate resources (e.g., average word length, average sentence length) may also be considered when identifying reading difficulty levels of members of the set of candidate resources.

Method 200 also includes recommending a selected candidate resource at 240. The selected candidate resource may be recommended to a user. The selected candidate resource may be recommended based on subject matter similarity between the selected candidate resource and the source document. In one example, determining subject matter similarity between the selected candidate resource and the source document may begin by representing the selected candidate resource as a first feature vector and representing the source document as a second feature vector. The feature vectors may be generated as a function of topics and keywords extracted at action 220 from the source document and the selected candidate resources. Similarity between the first feature vector and the second feature vector may then be measured (e.g., by measuring a distance between the first feature vector and the second feature vector).

The selected candidate resource may also be recommended based on reading difficulty level similarity between the selected candidate resource and the source document. The reading difficulty level similarity between the selected candidate resource and the source document may be determined by comparing reading difficulty levels of the candidate resources to a reading difficulty level calculated for the source document. In one example, the reading difficulty levels may be incorporated into the feature vector used to compare the subject matter similarities described above. In another example, the reading difficulty levels and the subject matter similarities may be treated as separate attributes that are independently weighed based on circumstances involving an instruction that initiates method 200.

Figure 3:
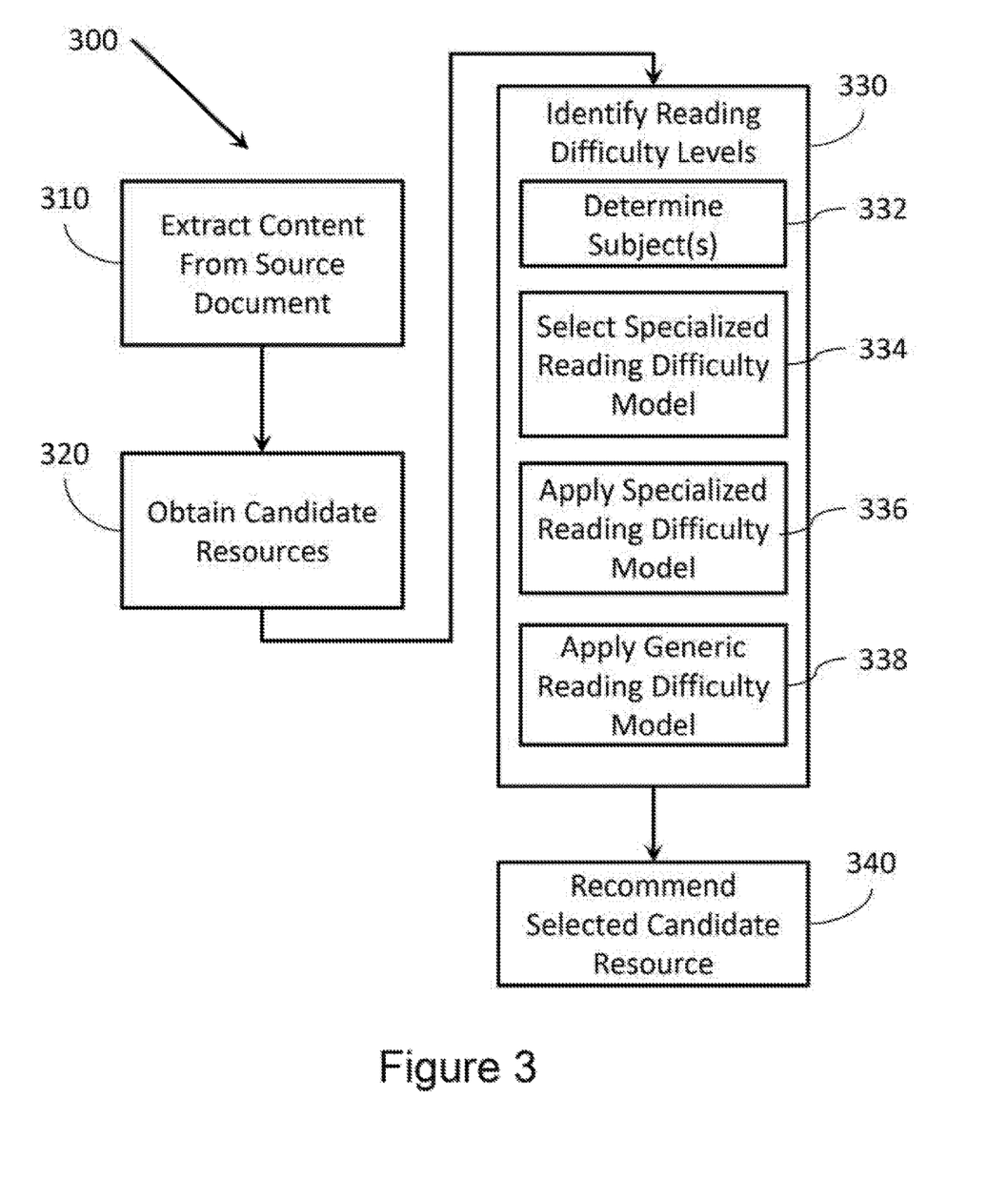
FIG. 3 illustrates another flowchart of example operations associated with reading difficulty level based resource recommendation.

FIG. 3 illustrates another example method 300 associated with reading difficulty level based resource recommendation. Method 300 includes several actions similar to those described above with reference to method 200 (FIG. 2). For example, method 300 includes obtaining a set of candidate resources based on a source document at 320, identifying reading difficulty levels of candidate resources at 330, and recommending a selected candidate resource at 340.

Method 300 also includes extracting the content from the source document at 310. As mentioned above, extracting the content may involve identifying topics defined by keywords from the source document. In one example, information retrieval techniques may be applied to extract the topics and keywords from the source document. These information retrieval techniques may include, for example, probabilistic latent semantic indexing (PLSI), latent Dirichlet allocation (LDA), and so forth.

Method 300 also breaks down the process of identifying reading difficulty levels at 330 into several component actions. For example, identifying reading difficulty levels at 330 includes determining a subject(s) associated with one or more of the source document and a member of the set of candidate resources at 332. As discussed above, determining subjects associated with a text may facilitate identifying the reading difficulty levels of that text because many techniques for identifying reading difficulty levels of a text are specialized towards certain types of texts (e.g., technical, non-technical, associated with a specific field).

Identifying reading difficulty levels at 330 also includes selecting a specialized reading difficulty model at 334. In one example, the specialized reading difficulty model may be selected based on the subject associated with the source document. In another example, the specialized reading difficulty model may be selected based on the subject associated with the member of the set of candidate resources. The decision regarding whether to apply a specialized reading difficulty level model based on the source document or the member of the set of candidate resources may depend on an attribute of, for example, a user that initiated method 300, an instruction that initiated method 300, and so forth.

Identifying reading difficulty levels at 330 also includes applying the specialized reading difficulty model to content in the member of the set of candidate resources at 336. Applying the specialized reading difficulty model may facilitate evaluating a reading difficulty level of the member of the set of candidate resources.

Identifying reading difficulty levels at 330 also includes applying a generic reading difficulty model to content in the member of the set of candidate resources at 338. Applying the generic reading difficulty model may facilitate evaluating a reading difficulty level of the member of the set of candidate resources. The generic reading difficulty model may serve as a baseline or control when different specialized reading difficulty models are applied to differing texts. This may ensure that there is a degree of comparability between texts. As described above, a generic reading difficulty model is a model that may function irrespective of the subject matter of a text being analyzed and may be based on, for example, grade levels at which readers typically learn words within the texts.

Once the generic and specialized reading difficulty models for a text have been applied to the text, the outputs of the reading difficulty models and/or the content similarities may be combined into a comparable format to facilitate comparing reading difficulties of the source document to the candidate resources. As mentioned above, weighting the content similarities against the reading difficulty similarities may be useful when selecting the selected candidate resource to ensure that a strong candidate resource is selected for a user. This weighting may depend, for example, on attributes of the user, on goals of a system performing method 300, and so forth. For example, a child in elementary school may be better served by a text closer to their reading difficulty level than one that covers content the child is looking for if the child does not understand it, whereas a college level student seeking a specific piece of information may prefer to have a text recommended that is highly related to the source document and likely to contain a piece of information the college level student is seeking.

Figure 4:
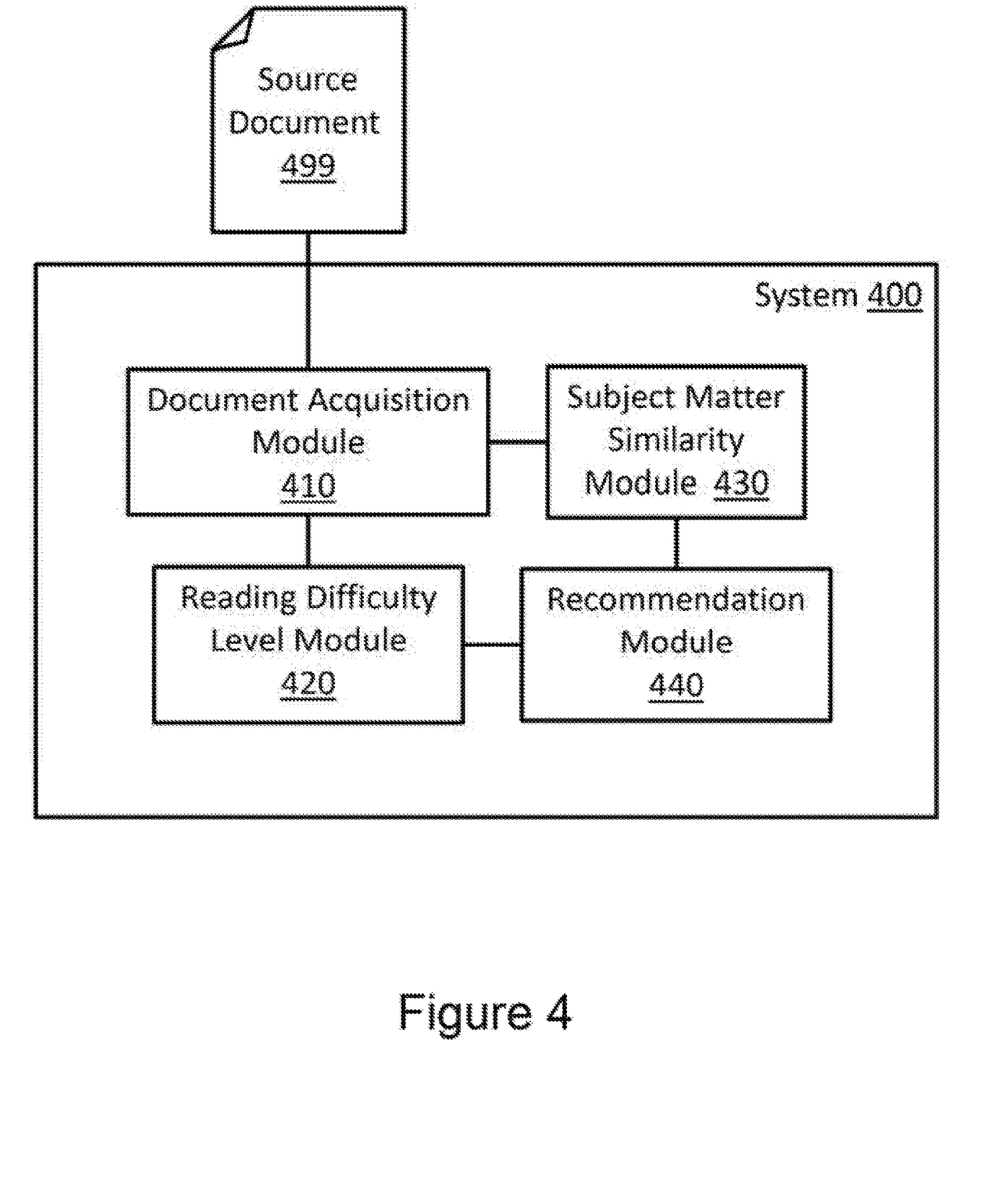
FIG. 4 illustrates an example system associated with reading difficulty level based resource recommendation.

FIG. 4 illustrates an example system 400 associated with reading difficulty level based resource recommendation. System 400 may be configured to recommend, based on a source document 499, a resource similar to source document 499 both in terms of content and in terms of reading difficulty level. System 400 includes a document acquisition module 410. Document acquisition module 410 may obtain candidate resources based on source document 499. Document acquisition module 410 may obtain the candidate resources using content extracted from source document 499. The content may be, for example, a portion of text from source document 499, topics and keywords that define the topics extracted from source document 499, and so forth. The candidate resources may be obtained from, for example, a search engine, a database, and so forth. In one example, system 400 may include the database (not shown) from which the candidate resources are obtained.

System 400 also includes a reading difficulty level module 420. Reading difficulty level module 420 may generate reading difficulty scores for candidate resources, source document 499, and so forth. Reading difficulty level module 420 may apply many techniques, including specialized reading difficulty level techniques, generic reading difficulty level techniques, and so forth for generating the reading difficulty scores for the candidate resources. Other attributes (e.g., average word length, average sentence length) may also be taken into account when generating the reading difficulty scores.

System 400 also includes a subject matter similarity module 430. Subject matter similarity module 430 may generate similarity scores between candidate resources and source document 499. The similarity scores may be generated based on topics and keywords extracted from the candidate resources which may then be compared to the topics and/or keywords extracted from source document 499.

System 400 also includes a recommendation module 440. Recommendation module 440 may recommend a subset of the candidate resources. The subset of the candidate resources may be recommended based on the reading difficulty scores and the similarity scores. The subset may be recommended to a user who, in one example, provided source document 499 to system 400 to obtain resources related to source document 499.

Figure 5:
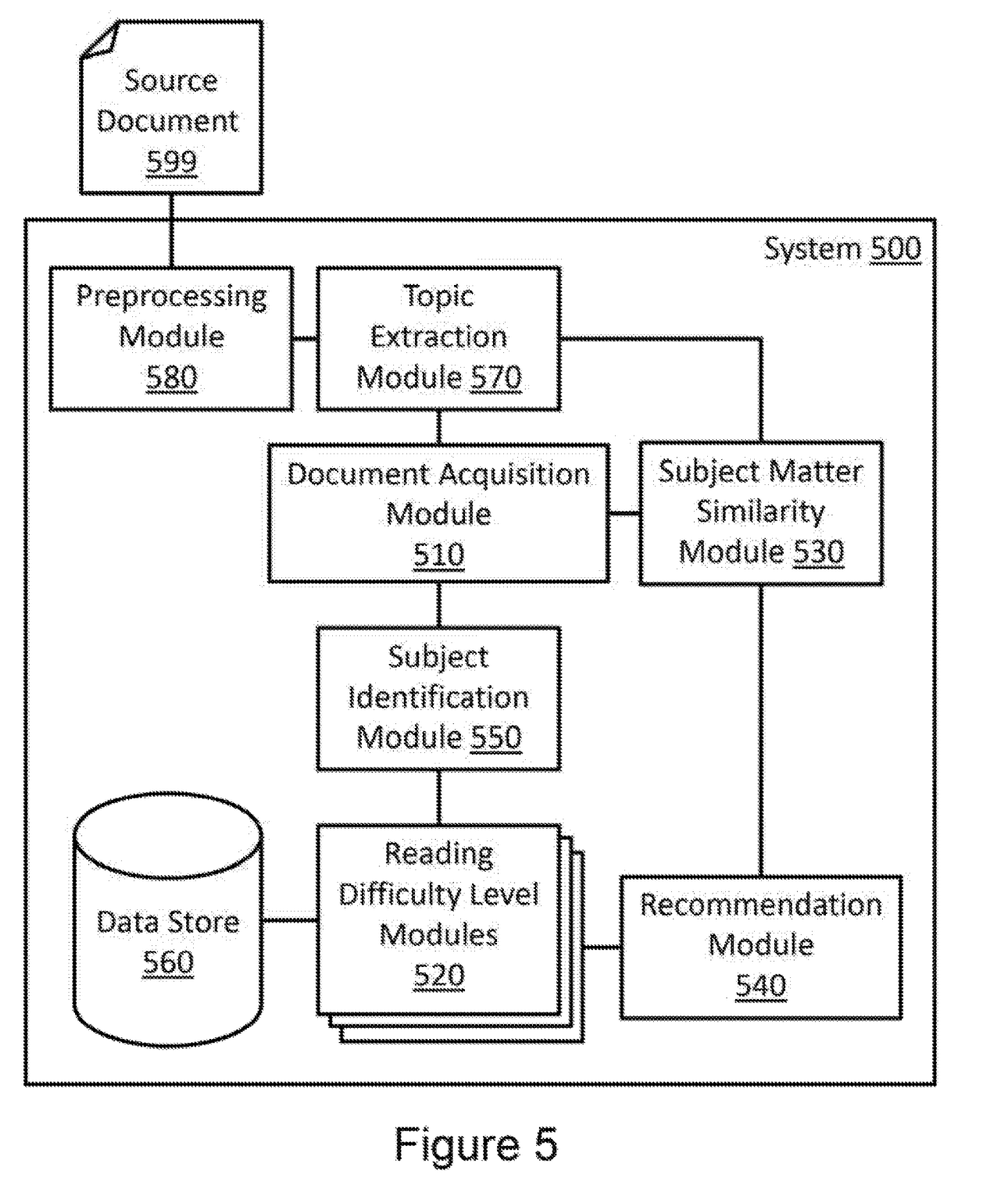
FIG. 5 illustrates another example system associated with reading difficulty level based resource recommendation.

FIG. 5 illustrates another example system 500 associated with reading difficulty level based resource recommendation. System 500 includes several items similar to those described above with reference to method 400 (FIG. 5). For example, system 500 includes a document acquisition module 510, a subject matter similarity module 530, and a recommendation module 540. In various examples, several of these modules may perform operations based on information extracted from a source document 599.

System 500 also includes a set of reading difficulty level modules 520. The set of reading difficulty level modules 520 may include a specialized reading difficulty level module. The specialized reading difficulty level module may generate reading difficulty scores for candidate resources that are associated with specialized subject matter.

System 500 also includes a subject identification module 550. Subject identification module 550 may control the specialized reading difficulty level module to generate a reading difficulty score for a candidate resource when the candidate resource is associated with the specialized subject matter. Consequently subject identification module 550 may determine when the candidate resource is associated with the specialized subject matter.

System 500 also includes a data store 560. Data store 560 may store content difficulty data organized by grade level. Consequently a member of the set of reading difficulty level modules 520 may generate reading difficulty scores for candidate resources based on the content difficulty data. This member of the set of reading difficulty level modules 520 may be a generic reading difficulty level module. Data store 560 may also store data used by other members of the set of reading difficulty level modules 520 as appropriate for the respective members.

System 500 also includes a topic extraction module 570. Topic extraction module 570 may extract topics from source document 599. Consequently, document acquisition module 510 may obtain the candidate resources using the topics. In one example, topic extraction module 570 may also extract topics from the candidate resources. In this example, subject matter similarity module 530 may generate the similarity scores for the candidate resources by comparing the topics extracted from source document 599 to the topics extracted from respective candidate resources. Extracting topics may also include identifying keywords that define the topic. The keywords may be words in a text that appear near one another in the text when the keywords are discussed.

System 500 also includes a preprocessing module 580. Preprocessing module 580 may obtain a user query indicating a passage from source document 599. After receiving the user query, preprocessing module may prepare source document 599 for processing by, for example, document acquisition module 510 and other modules. The preprocessing may include, for example, removing stop words from source document 599, removing unnecessary content from document 599 (e.g., advertisements), stemming, and so forth.

Figure 6:
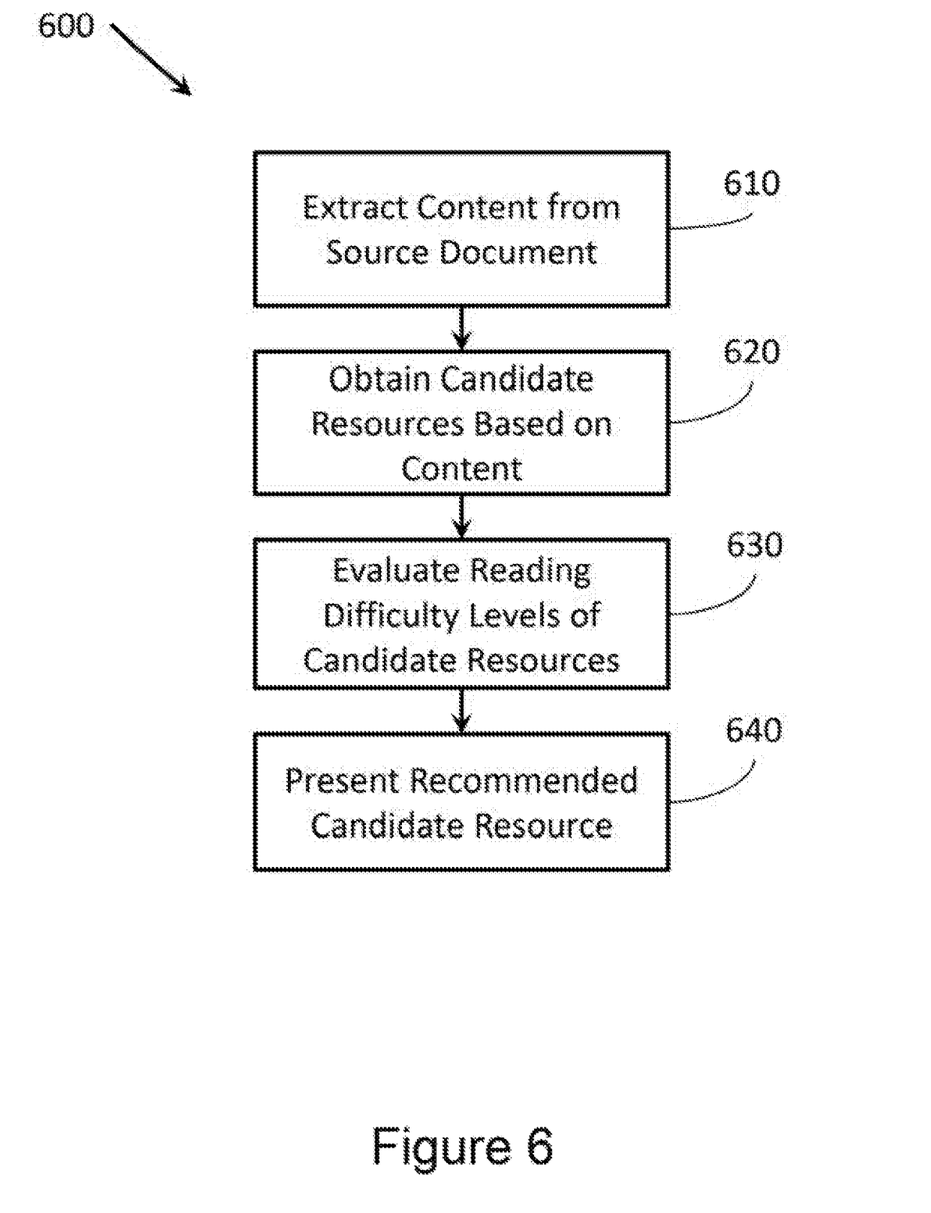
FIG. 6 illustrates another flowchart of example operations associated with reading difficulty level based resource recommendation.

FIG. 6 illustrates another example method 600 associated with reading difficulty level based resource recommendation. Method 600 includes extracting content from a source document at 610. The content may be extracted from the source document in response to a user interaction with the source document. The content may be extracted by identifying topics and keywords defining the topics within the source document.

Method 600 also includes obtaining candidate resources at 620. The candidate resources may be related to the source document. The candidate resources may be obtained using the content extracted from the source document at action 610. In an example where the candidate resources are obtained using a search engine, a search query containing, for example, one or more topics and/or keywords may be used to obtain the candidate resources.

Method 600 also includes evaluating reading difficulty levels of the candidate resources at 630. The reading difficulty levels of the candidate resources may be evaluated based on the content extracted from the candidate resources. Reading difficulty levels of candidate resources may be evaluated using, for example, a module designed to evaluate reading difficulty levels of texts relating to a specialized topic associated with the source document, a module designed to evaluate reading difficulty levels of texts relating to a specialized topic associated with the respective candidate resource, a generic reading difficulty level evaluation module, and so forth.

Method 600 also includes presenting a recommended candidate resource at 640. The recommended candidate resource may be presented to the user who interacted with the source document at action 610. The recommended candidate resource may be selected according to, for example, the reading difficulty level of the candidate resources, a reading difficulty level of the source document, the content of the source document, content of the candidate resources, and so forth. This may provide the user a resource containing information relevant to the user at a reading difficulty level appropriate to the user.

Figure 7:
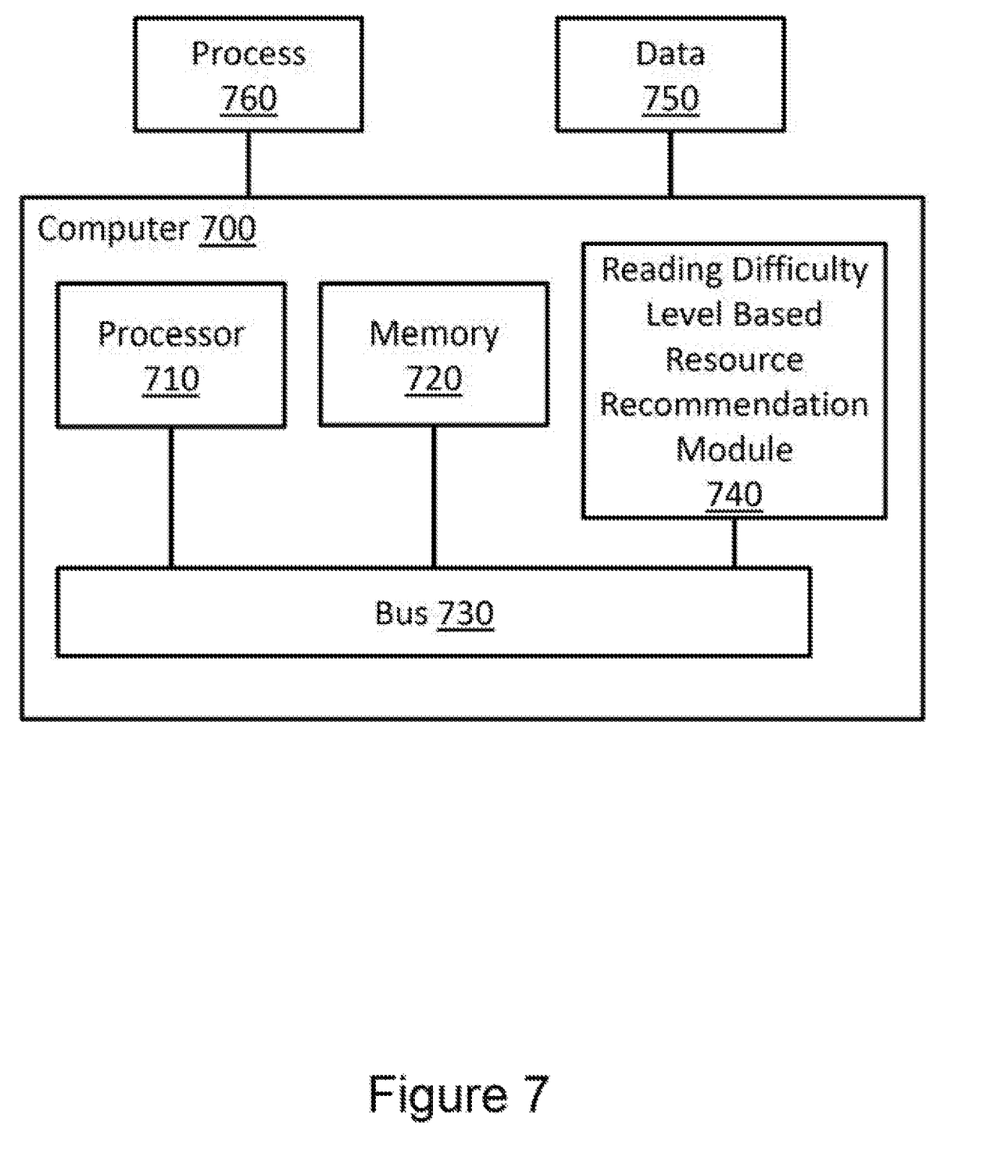
FIG. 7 illustrates an example computing device in which example systems and methods, and equivalents, may operate.

FIG. 7 illustrates an example computing device in which example systems and methods, and equivalents, may operate. The example computing device may be a computer 700 that includes a processor 710 and a memory 720 connected by a bus 730. The computer 700 includes a reading difficulty level based resource recommendation module 740. In different examples, reading difficulty level based resource recommendation module 740 may be implemented as a non-transitory computer-readable medium storing computer-executable instructions, in hardware, software, firmware, an application specific integrated circuit, and/or combinations thereof.

The instructions may also be presented to computer 700 as data 750 and/or process 760 that are temporarily stored in memory 720 and then executed by processor 710. The processor 710 may be a variety of various processors including dual microprocessor and other multi-processor architectures. Memory 720 may include non-volatile memory (e.g., read only memory) and/or volatile memory (e.g., random access memory). Memory 720 may also be, for example, a magnetic disk drive, a solid state disk drive, a floppy disk drive, a tape drive, a flash memory card, an optical disk, and so on. Thus, memory 720 may store process 760 and/or data 750. Computer 700 may also be associated with other devices including other computers, peripherals, and so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein.

What is claimed is:

1. A non-transitory computer-readable medium storing computer-executable instructions that when executed by a computer cause the computer to provide a user interface and utilize a search engine, the computer to:
   obtain from the search engine a set of candidate resources related to content extracted from a source document;
   identify reading difficulty levels of members of the set of candidate resources;
   generate a feature vector for each of the candidate resources and the source document, the feature vectors being compared to determine subject matter similarity between the candidate resources and the source document; and
   recommend a selected candidate resource to a user based on the subject matter similarity between the selected candidate resource and the source document, and based on reading difficulty level similarity between the selected candidate resource and the source document; and
   display, in the user interface, information from the selected candidate resource in connection with the source document.

2. The non-transitory computer-readable medium of claim 1, where the source document comprises a video and the instructions further cause the computer to extract text from the video to be searched by the search engine as the content from the source document.

3. The non-transitory computer-readable medium of claim 1, where the instructions for identifying reading difficulty levels of members of the set of candidate resources cause the computer to:
 determine at least one of a subject associated with the source document and a subject associated with a member of the set of candidate resources; and
 select a specialized reading difficulty model based on at least one of the subject associated with the source resource and the subject associated with the member of the set of candidate resource; and
 apply the specialized reading difficulty model to content in the member of the set of candidate resources to evaluate reading difficulty of the member of the set of candidate resources.

4. The non-transitory computer-readable medium of claim 1, where the instructions for identifying reading difficulty levels of members of the set of candidate resources further cause the computer to: apply a generic reading difficulty model to content in the member of the set of candidate resources to evaluate reading difficulty of the member of the set of candidate resources.

5. The non-transitory computer-readable medium of claim 1, where the candidate resources are obtained from one or more of a search engine and a database.

6. A system including a user interface for a search engine, the user interface of a computer comprising:
 input controls with which a user designates content of interest within a source document;
 a document acquisition module to obtain candidate resources from a search engine based on the user-designated content of the source document;
 a reading difficulty level module to generate reading difficulty scores for each of the candidate resources;
 a subject matter similarity module to generate similarity scores between each of the candidate resources and the source document; and
 a recommendation module to recommend a subset of the candidate resources based on both of the reading difficulty scores and the similarity scores, the user interface displaying the subset of candidate resources with display of the source document;
 wherein the reading difficulty level module is to generate a specialized reading difficulty score based on the candidate resource being specific to a particular field, the specialized reading difficulty score based on standards in that particular field; and
 wherein the subject matter similarity module is to generate a feature vector for each of the source document and candidate resources, the feature vectors being compared to determine subject matter similarity.

7. The system of claim 6, where the reading difficulty level module is a member of a set of reading difficulty level modules, and where the set of reading difficulty level modules comprises a specialized reading difficulty level module to generate reading difficulty scores for candidate resources associated with specialized subject matter.

8. The system of claim 7, further comprising a subject identification module to control the specialized reading difficulty level module to generate a reading difficulty score for a candidate resource when the candidate resource is associated with the specialized subject matter.

9. The system of claim 6, further comprising a data store to store content difficulty data organized by grade level, and where the reading difficulty module generates the reading difficulty scores based on the content difficulty data.

10. The system of claim 6, further comprising: a topic extraction module to extract topics from the source document, and where the document acquisition module obtains the candidate resources using the topics.

11. The system of claim 10, where the topic extraction module also extracts topics from the candidate resources, where the subject matter similarity module generates the similarity scores for the candidate resources by comparing the topics extracted from the source document to the topics extracted from respective candidate resources.

12. The system of claim 6, further comprising: a preprocessing module to obtain a user query indicating a passage from the source document and to prepare the source document for processing by the document acquisition module.

13. A method, comprising:
 extracting content from a source document in response to a user interaction with the source document;
 obtaining, using the content, candidate resources related to the source document;
 evaluating the reading difficulty level of the candidate resources based on content extracted from the candidate resources, including calculating a probability distribution of words across a number of different subject matters when generating the reading difficulty level;
 presenting, to the user, a recommended candidate resource, where the recommended candidate resource is selected based on the reading difficulty level of the candidate resources, a reading difficulty level of the source document, the content of the source document, and content of the candidate resources.

14. The method of claim 13, where the reading difficulty level of a candidate resource is evaluated using one or more of a module designed to evaluate reading difficulty levels of documents relating to a specialized topic associated with the source document, a module designed to evaluate a reading difficulty level of documents having a specialized topic associated with the candidate resource, and a generic reading difficulty level evaluation module.

15. The system of claim 6, wherein the user interface comprises a first window for display of content from the source document and a second window for display of content from, or a link to, any of the subset of candidate resources.

16. The system of claim 6, wherein display the subset of candidate resources comprises displaying a link to each of the subset of candidate resources.

17. The non-transitory computer-readable medium of claim 1, wherein identifying reading difficulty levels comprises generating a specialized reading difficulty score based on one of the candidate resource being specific to a particular field, the specialized reading difficulty score based on standards in that particular field.

18. The system of claim 6, wherein the reading difficulty level module is to calculate a probability distribution of words across a number of different subject matters when generating a reading difficulty score.

19. The method of claim 13, further comprising generating a feature vector for each of the source document and candidate resources, the feature vectors being compared to determine subject matter similarity.

\* \* \* \* \*